(12) United States Patent
Sawchuk et al.

(10) Patent No.: US 9,057,391 B2
(45) Date of Patent: Jun. 16, 2015

(54) REFLECTOR FOR FLUID MEASUREMENT SYSTEM

(75) Inventors: Daniel A. Sawchuk, Chestermere (CA); Reginald Selirio, Calgary (CA)

(73) Assignee: Canada Pipeline Accessories, Co. Ltd., Calgary, Alberta (CA)

( * ) Notice: Subject to any disclaimer, the term of this patent is extended or adjusted under 35 U.S.C. 154(b) by 377 days.

(21) Appl. No.: 13/473,761

(22) Filed: May 17, 2012

(65) Prior Publication Data

US 2013/0306183 A1 Nov. 21, 2013

(51) Int. Cl.
*F15D 1/02* (2006.01)
*G01F 15/00* (2006.01)

(52) U.S. Cl.
CPC . *F15D 1/02* (2013.01); *G01F 15/00* (2013.01)

(58) Field of Classification Search
CPC .......... F16L 55/02; F16L 55/02709; F16L 55/02718; F16L 55/02736; F16L 55/033; F16L 55/0331; F16L 55/04; G01F 15/00; F15D 1/02
USPC ............ 138/40, 42, 44; 251/127; 73/861.52; 366/336–338, 340
See application file for complete search history.

(56) References Cited

U.S. PATENT DOCUMENTS

| | | | |
|---|---|---|---|
| 1,844,108 A * | 2/1932 | Smythe | 29/896.2 |
| 2,929,248 A * | 3/1960 | Sprenkle | 73/198 |
| D198,356 S | 6/1964 | Wahlin et al. | |
| D200,088 S | 1/1965 | Earnshaw | |
| 3,232,550 A | 2/1966 | Cuva | |
| 4,408,892 A * | 10/1983 | Combes et al. | 366/337 |
| 5,327,941 A * | 7/1994 | Bitsakis et al. | 138/42 |
| 5,341,848 A | 8/1994 | Laws | |
| 5,529,093 A * | 6/1996 | Gallagher et al. | 138/44 |
| 5,606,297 A | 2/1997 | Phillips | |
| 7,011,180 B2 | 3/2006 | Gallagher et al. | |
| 7,073,534 B2 | 7/2006 | Sawchuk et al. | |
| 7,089,963 B2 | 8/2006 | Meheen | |
| 7,303,046 B2 | 12/2007 | Gallagher et al. | |
| 7,303,047 B2 | 12/2007 | Gallagher et al. | |
| 7,303,048 B2 | 12/2007 | Gallagher et al. | |
| 7,370,675 B2 * | 5/2008 | Cancade et al. | 138/45 |
| D577,100 S | 9/2008 | Brown et al. | |
| D577,101 S | 9/2008 | Kong et al. | |
| 7,845,688 B2 | 12/2010 | Gallagher et al. | |
| 8,132,961 B1 | 3/2012 | England et al. | |
| D674,878 S | 1/2013 | Jones et al. | |
| D682,987 S | 5/2013 | Blum | |
| 2008/0037366 A1 * | 2/2008 | Smith | 366/337 |
| 2008/0246277 A1 | 10/2008 | Gallagher et al. | |
| 2010/0224275 A1 * | 9/2010 | Pinkerton | 138/39 |

FOREIGN PATENT DOCUMENTS

| | | |
|---|---|---|
| CA | 2171828 | 3/1995 |
| CA | 2228928 | 8/1995 |
| CA | 2787659 | 7/2011 |
| GB | 1469648 A | 4/1977 |

* cited by examiner

*Primary Examiner* — J. Casimer Jacyna
(74) *Attorney, Agent, or Firm* — Cahn & Samuels, LLP

(57) ABSTRACT

A reflector for a fluid flow system includes an orifice plate comprising a flange and an opening; at least one disk; and at least one vane extending between the orifice plate and the at least one disk.

28 Claims, 19 Drawing Sheets

| Forward Run | | | | |
|---|---|---|---|---|
| Inlet Velocity (m/s) | Average Delta P (Pa) | Average Delta P (psi) | Average Delta P (%) | K Factor |
| 10 | 13696.6 | 1.98652 | 0.27% | 7.832 |
| 20 | 54717.9 | 7.93617 | 1.08% | 7.828 |
| 30 | 121476.9 | 17.6187 | 2.37% | 7.823 |
| 40 | 214568.7 | 31.1206 | 4.11% | 7.684 |
| 50 | 326389.0 | 47.3387 | 6.13% | 7.481 |
| 60 | 458883.8 | 66.5555 | 8.41% | 7.320 |
| 75 | 685767.1 | 99.4621 | 12.06% | 7.026 |

| Backward Run |||||
|---|---|---|---|---|
| Inlet Velocity (m/s) | Average Delta P (Pa) | Average Delta P (psi) | Average Delta P (%) | K Factor |
| 10 | 14070.6 | 2.04076 | 0.28% | 7.992 |
| 20 | 50870.8 | 7.37819 | 1.01% | 7.226 |
| 30 | 110851.9 | 16.0777 | 2.17% | 7.005 |
| 40 | 192073.4 | 27.8579 | 3.70% | 6.832 |
| 50 | 294999.7 | 42.7861 | 5.57% | 6.717 |
| 60 | 411983.4 | 59.7531 | 7.61% | 6.520 |
| 75 | 696374.9 | 101.001 | 12.22% | 7.053 |

REFLECTOR FOR FLUID MEASUREMENT SYSTEM

FIELD OF INVENTION

The present invention is directed to a fluid measurement system in pipelines that convey fluid, typically in the oil and gas industry. In particular, the present invention is directed to a reflector to deflect noise, pulsation, and dynamic fluid behavior from a downstream device, such as a flow meter.

BACKGROUND OF INVENTION

Pipelines are used to transport fluids in various industries, including chemical, oil and gas, and manufacturing. These industries use processes that require fluid flow rates to be accurately measured. These measurements are performed at locations known as meter stations using a variety of different meter types. These meters function in different ways, they can use, for example, differential pressure of the fluid across an obstruction, ultrasonic signal travel times, turbine blade rotational speed, Coriolis forces, or even electrical and magnetic fields being generated due to bulk fluid movement. Almost all of these measurement methods require use of the fluid velocity distribution, known as a velocity flow profile.

To achieve the most accurate measurements, the flow profile of the fluid entering a metering device should be stable, non-rotating, and symmetric. This type of velocity distribution is known as a fully developed flow profile, and it forms naturally in very long lengths of uninterrupted straight pipe. However, having long lengths of straight pipe is impractical and cost prohibitive. As a result, meter station piping often contains elbows, tees, valves and other assemblies that distort the flow profile into an asymmetric, unstable, and distorted configuration. This makes it very difficult to measure the fluid flow rate in a consistently accurate and repeatable manner.

SUMMARY OF INVENTION

According to an embodiment of the present invention, a reflector for a fluid flow system comprises an orifice plate comprising a flange and an opening; at least one disk; and at least one vane extending between the orifice plate and the at least one disk.

According to another embodiment of the present invention, a pipe assembly includes a fluid flow pipe; at least one reflector disposed entirely within the fluid flow pipe in an orientation in which the at least one disk and the orifice plate are substantially perpendicular to a longitudinal axis of said fluid flow pipe.

According to yet another embodiment of the present invention, a fluid flow system includes a fluid flow pipe; at least one reflector disposed entirely within the fluid flow pipe in an orientation in which the at least one disk and the orifice plate are substantially perpendicular to a longitudinal axis of said fluid flow pipe; and a device downstream of the reflector.

An object of the present invention is to improve fluid meter performance by isolating a device such as a flow meter from at least one of dynamic behavior, noise, or pulsation in a fluid.

Another object of the present invention is to prevent or reduce flow meter error due to at least one of dynamic behavior, noise, or pulsation in a fluid.

An advantage of the present invention is that the reflector can be utilized in existing piping without making modifications. The reflector is compact and only requires a flanged connection, which is frequently available in existing meter stations.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In this detailed description, references to "one embodiment", "an embodiment", or "in embodiments" mean that the feature being referred to is included in at least one embodiment of the invention. Moreover, separate references to "one embodiment", "an embodiment", or "embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the methods and systems should become evident to a person of ordinary skill in the art.

DETAILED DESCRIPTION OF INVENTION

The reflector according to the present invention comprises an inline deflector or isolator that is designed to reduce or prevent at least one of noise, pulsation, or dynamic fluid behavior from reaching a downstream device, such as a flow meter. As a result, the reflector improves flow meter performance by minimizing flow meter errors; allows for less spacing between pipe equipment; and allows more freedom in designing meter station layout. By blocking noise and pulsation, the reflector also helps inhibit or prevent the formation of standing waves, which may cause meter failures. According to the present invention, the reflector fits completely into a pipe, without the need for any packing material and importantly without the need to cut out and replace a section of pipe. Advantageously, the reflector may fit into an existing pipe.

Figure 1:
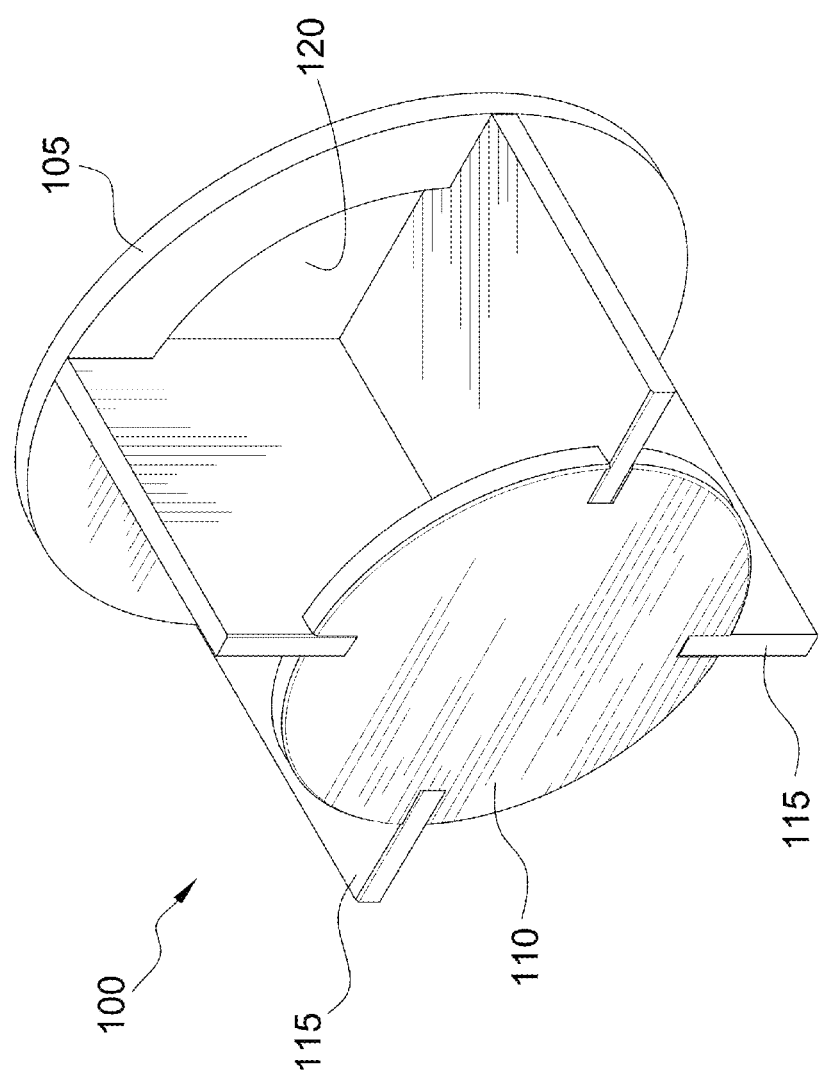
FIG. 1 is a perspective view of a reflector in a forward configuration according to an embodiment of the present invention.
Figure 2:
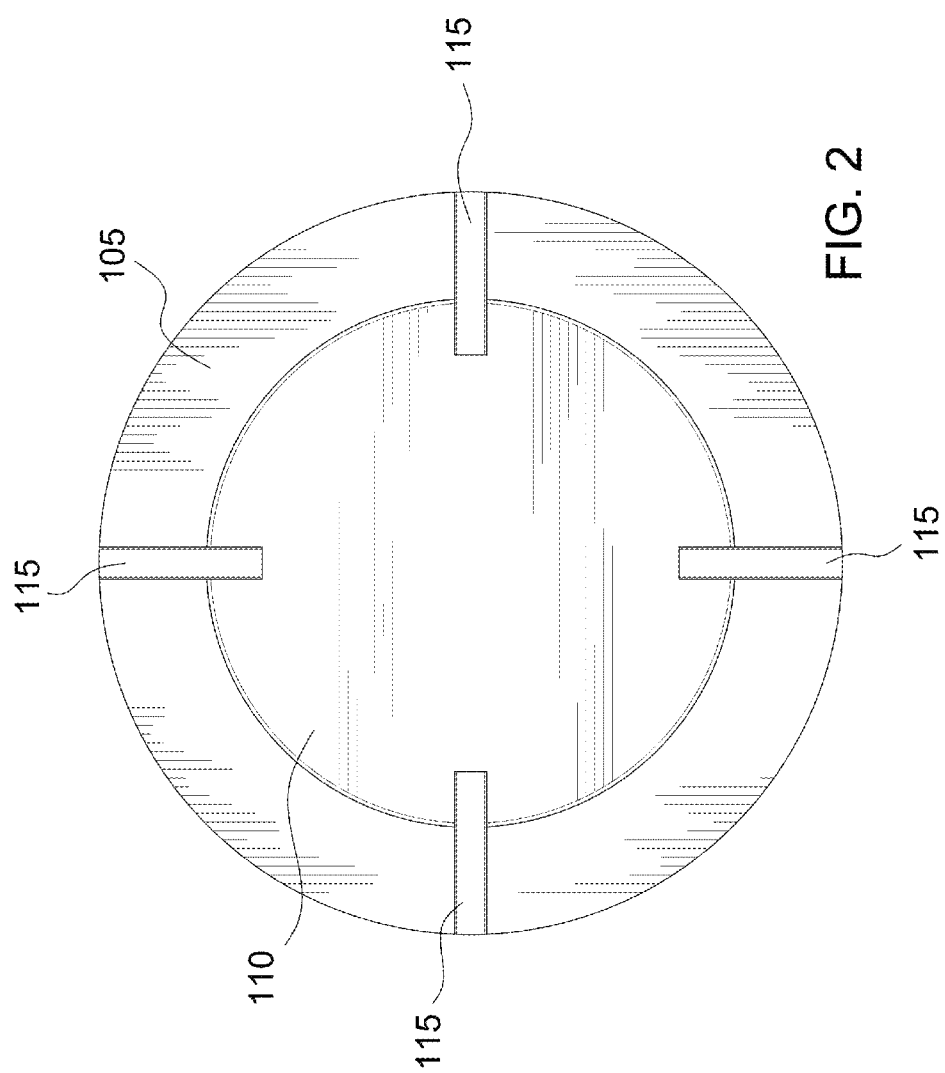
FIG. 2 is a front view of the reflector of FIG. 1.
Figure 3:
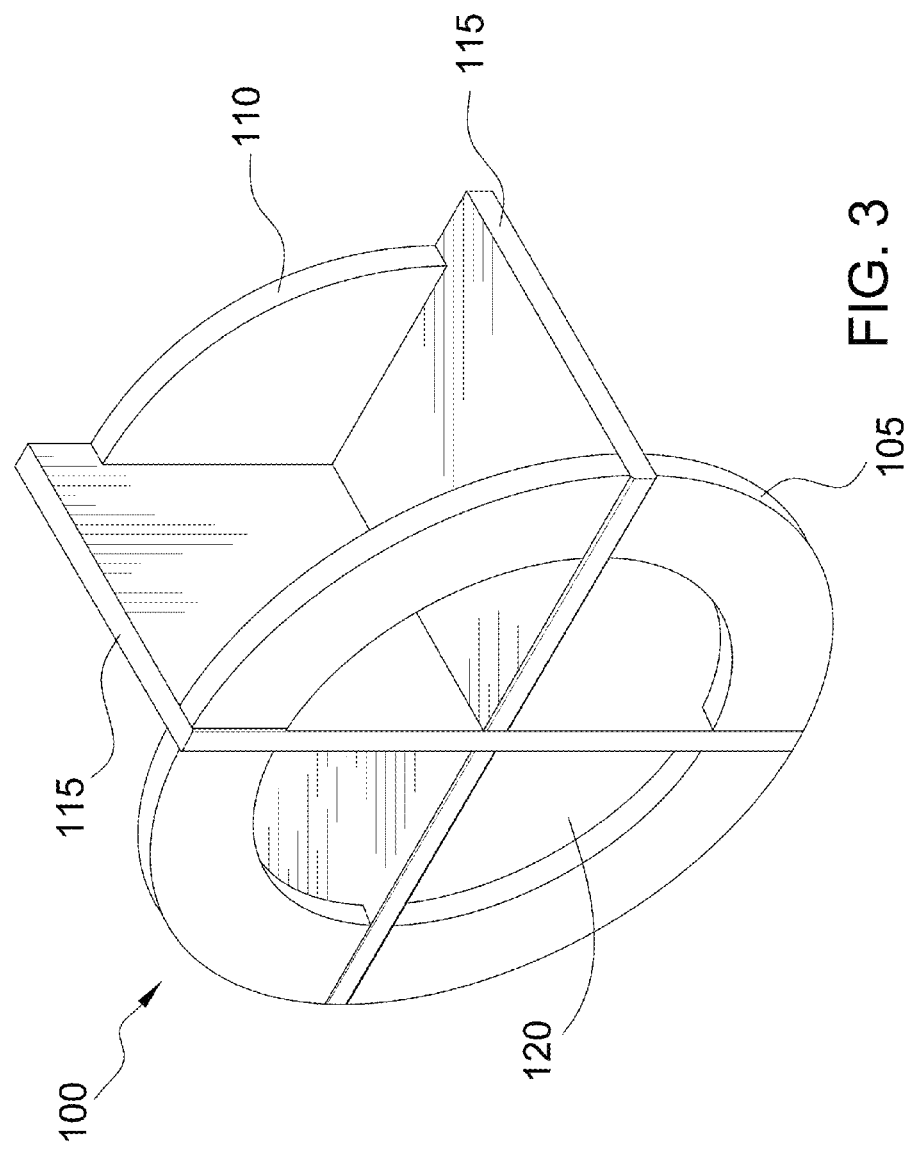
FIG. 3 is a perspective view of the reflector of FIG. 1 in a backward configuration.

As shown in FIG. 1, a reflector 100 according to an embodiment of the present invention comprises of an orifice plate 105 comprising a flange and an opening 120; at least one disk 110, and at least one vane 115 extending between the orifice plate 105 and the disk 110. The orifice plate 105 and disk 110 may overlap in a longitudinal direction looking at the reflector 100 from either an upstream (FIG. 2) or a downstream location. The reflector 100 may be installed in a pipe in either a forward configuration, as shown in FIG. 2 (disk 110 upstream of orifice plate 105), or a backward configuration, as shown in FIG. 3 (disk 110 downstream of orifice plate 105).

In specific embodiments, the disk 110 may be about the same diameter as the opening 120 in the orifice plate 105. If viewed from an upstream side (FIG. 2), there appears to be no fluid passage. This configuration ensures that there is about 100% deflection, without impacting the passage of flow in a pipeline. The at least one disk 110 may be of any effective thickness. In at least one embodiment, the at least one disk 110 may have angled or rounded edges.

The at least one disk 110 may be arranged specifically to deflect and block dynamic behavior, while still allowing a fluid to flow through. In specific embodiments, there may be more than one disk 110, for example a plurality of disks, and the spacing between disks can vary. For example, the spacing between disks 110 in a longitudinal direction may be about 1 inside pipe diameter, corresponding to a pipe into which the reflector 100 is placed. In one or more embodiments, the at least one disk 110 may comprise a plurality of apertures or holes.

Figure 4:
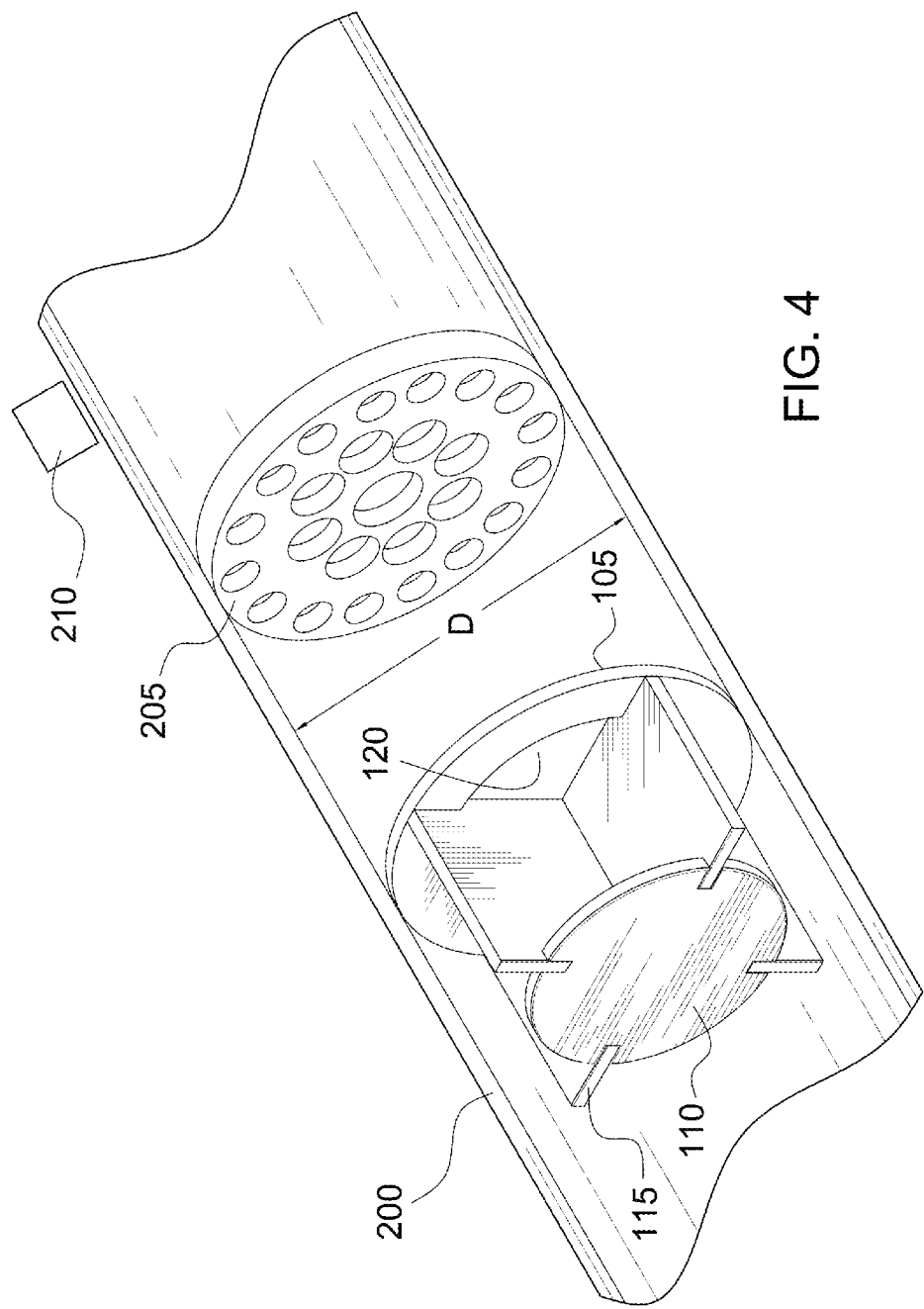
FIG. 4 is a perspective view of the reflector of FIG. 1 situated in a pipeline.

In specific embodiments, the opening 120 of the orifice plate 105 may have a diameter of about 0.4 D to about 0.9 D, for example 0.707 D, wherein D is the inside pipe diameter of a pipe 200 in which the reflector is installed (FIG. 4). The distance between the orifice plate 105 and the at least one disk 110 is calculated to provide a small pressure drop and disturb fluid flow the least depending on a specific pipe configuration. In embodiments, the distance between the orifice plate 105 and disk 110 may be about 0.5 D but may be larger, for example, 0.5 D to 1.0 D. FIG. 4 also shows a flow conditioner 205 and flow meter 210. At least one reflector may be integral with a wall of a fluid flow pipe in an orientation in which the at least one disk and the orifice plate are substantially perpendicular to a longitude axis of said fluid flow pipe.

According to the present invention, the number and arrangement of the at least one vane 115 may vary. The at least one vane 115 provides structural support to the reflector 110. The at least one vane may comprise a plurality of vanes arranged in an array. The at least one vane is designed to maximize strength and not to vibrate due to the pipeline forces. In specific embodiments, the at least one disk 110, at least one vane 115, and the orifice plate 105 may be welded or bonded to each other and may compromise metal. Alternatively, these elements may be keyed so that they physically interlock together.

In specific embodiments, the reflector may be used in conjunction with a flow conditioner, for example, a multi hole flow conditioner (e.g., CPA 50E plate from Canada Pipeline Accessories Co., Ltd.). The flow conditioner may be arranged upstream or downstream of the reflector inside a pipeline. Other suitable flow conditioners include the CPA TBR, and the CPA 50E RTJ flow conditioners available from Canada Pipeline Accessories of Calgary, Alberta Canada; and the flow conditioners described in U.S. Pat. No. 5,341,848, which is herein incorporated by reference in its entirety.

Figure 5:
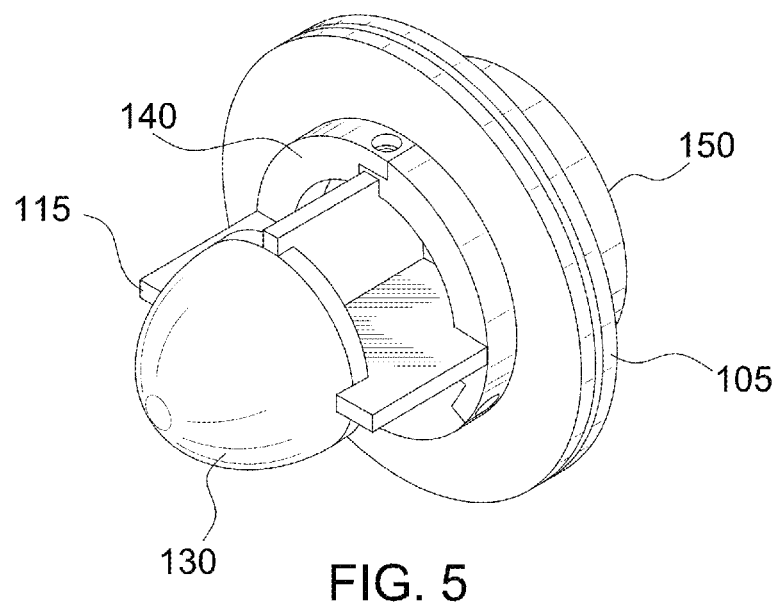
FIG. 5 is a perspective view of a reflector in a forward configuration according to a second embodiment of the present invention.
Figure 6:
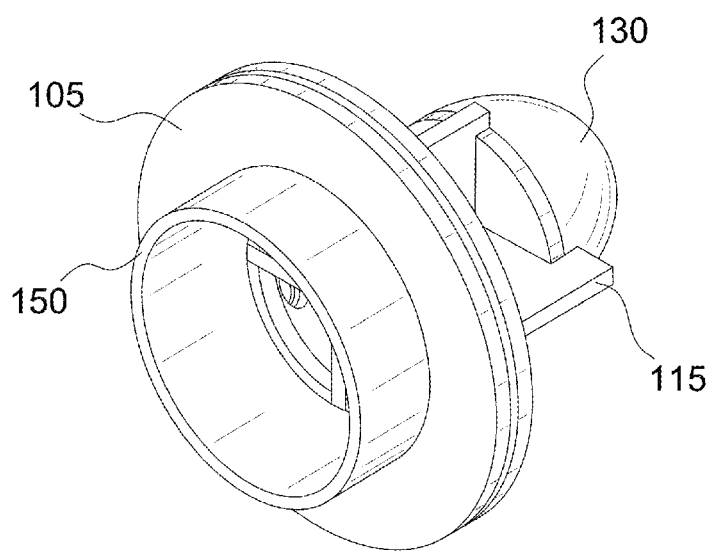
FIG. 6 is a perspective view of the reflector of FIG. 5 in a backward configuration.
Figure 7:
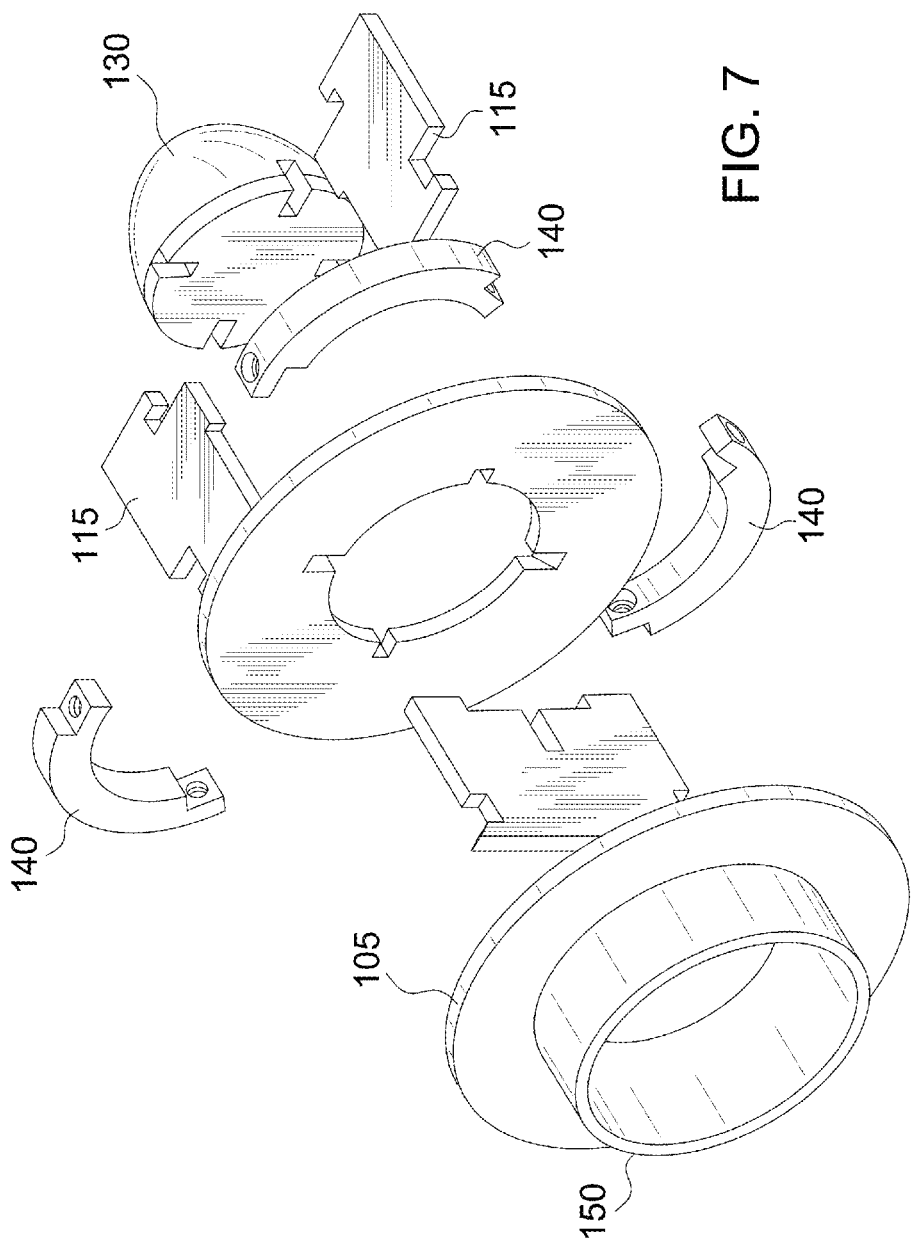
FIG. 7 is an exploded view of the reflector of FIG. 6.

FIG. 5 is a view of a reflector 100 according to a second embodiment of the present invention. In this embodiment, the reflector comprises a nose cone 130 in place of, or in addition to, at least one disk 110. A ring clamp 140 holds a plurality of vanes 115 together. The ring clamp 140 may comprise one or more pieces, for example, three pieces as shown in FIG. 7. The reflector may also have a diffuser 150 attached to the flange of orifice plate 105. FIG. 6 is a perspective view of the reflector of FIG. 5 in a backward configuration.

Figure 8:
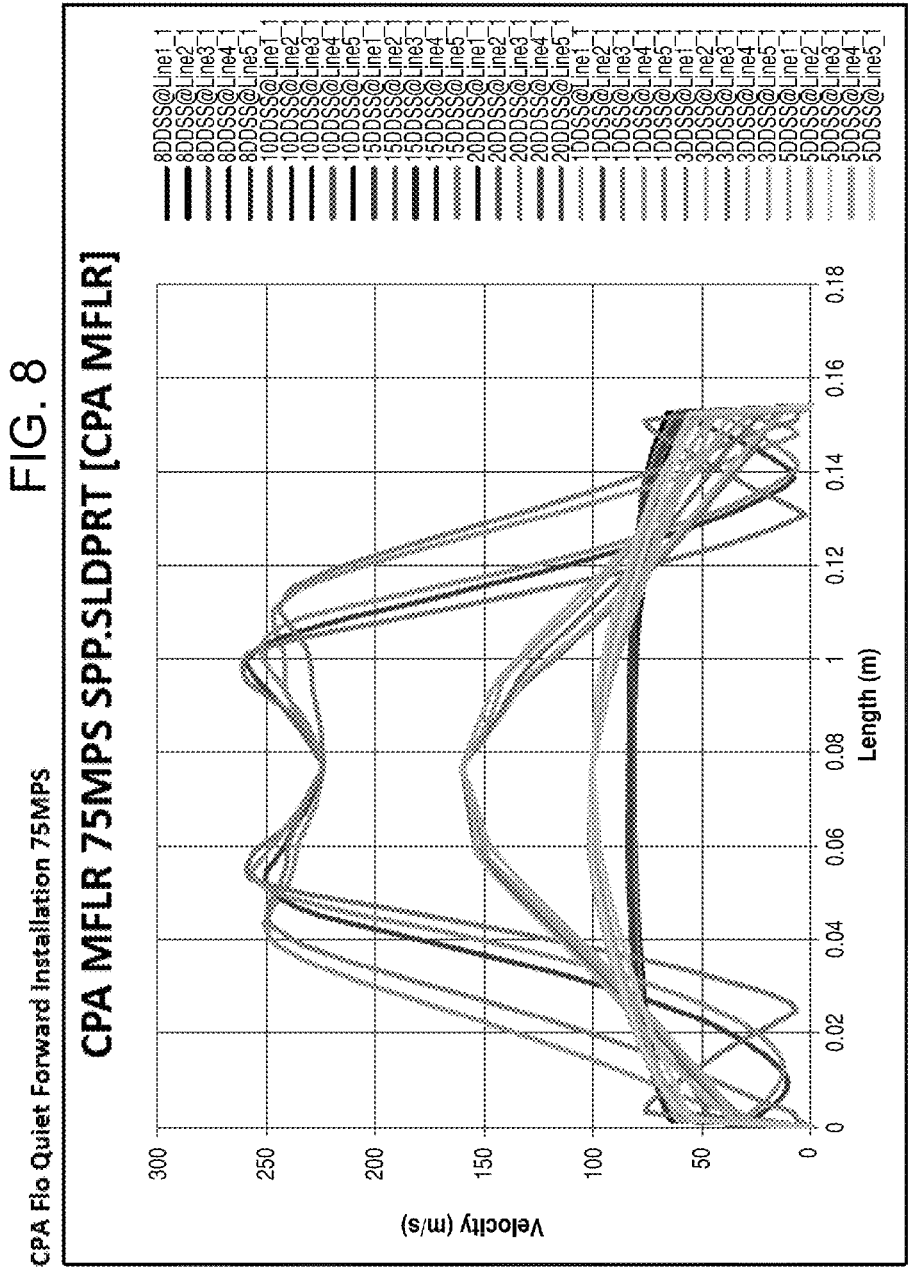
FIG. 8 is a diagram showing a flow performance profile downstream of a reflector installed in a pipeline in a forward configuration according to an embodiment of the present invention.

FIG. 8 is a diagram showing flow performance profiles of the reflector of FIG. 1 installed in a straight pipe in a forward configuration. For a fluid having an initial fluid velocity of 75 m/s, FIG. 8 shows the fluid performance profiles at distances (measured in pipe diameters) downstream of the reflector. All runs were done with natural gas as the fluid and with a 5 MPa outlet pressure.

As shown, the flow profile in a straight pipe returns to a fully developed form about 8 diameters after the reflector (i.e., 8 D). The illustrated flow lines are grouped together at measured distances of 1, 3, 5, 8, 10, 15, and 20 pipe diameters downstream of the reflector. Lines 1-5 (Line 1-Line 5) at each measured distance correspond to measurement of fluid profile as a vertical line through the pipeline is rotated at 18° for each line. Thus, lines 1-5 lines show fluid profile behavior over an angle of 90° (i.e., 18°, 36°, 54°, 72°, and 90°) at each measured distance.

Figure 9:
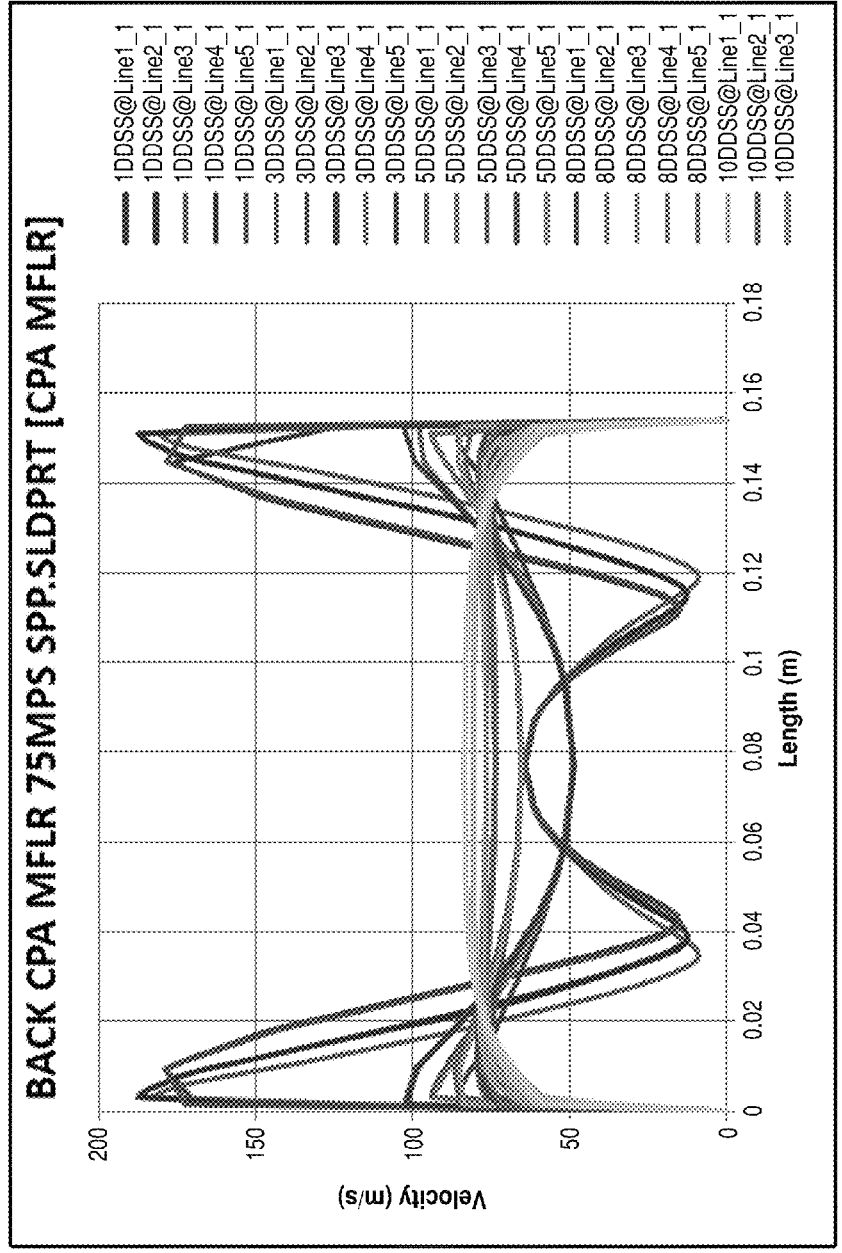
FIG. 9 is a diagram showing a flow performance profile downstream of a reflector installed in a pipeline in a backward configuration according to an embodiment of the present invention.

FIG. 9 shows the flow profile of the reflector of FIG. 8 is installed in a backward configuration.

Figure 10:
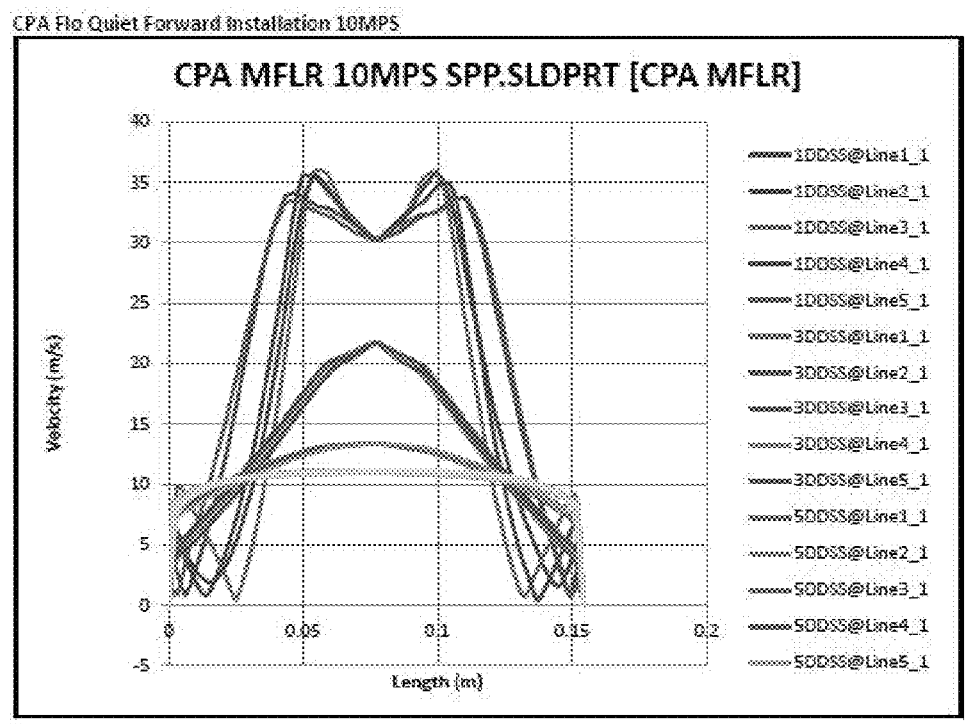
FIG. 10 is a diagram showing a flow performance profile downstream of a reflector installed in a pipeline in a forward configuration according to another embodiment of the present invention.
Figure 11:
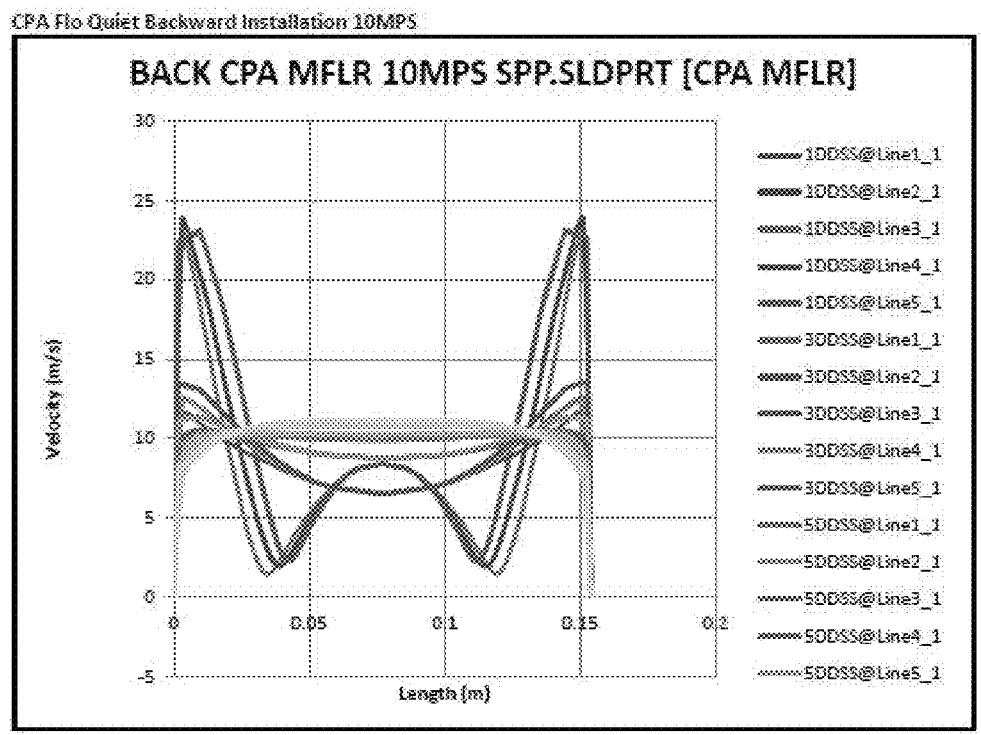
FIG. 11 is a diagram showing a flow performance profile downstream of a reflector installed in a pipeline in a backward configuration according to another embodiment of the present invention.

FIG. 10 is a diagram showing flow performance profiles of a reflector according to an embodiment of the present invention installed in a pipe in a forward configuration for a fluid having an initial fluid velocity of 10 m/s. FIG. 11 shows the fluid performance profile of the reflector of FIG. 10 installed in backward configuration. The results at 75 m/s and 10 m/s are similar. The distances required to reach a fully developed profile are about 8 D if the reflector is installed in a forward configuration and about 20 D+ if the reflector in installed in a backward configuration.

Figure 12:
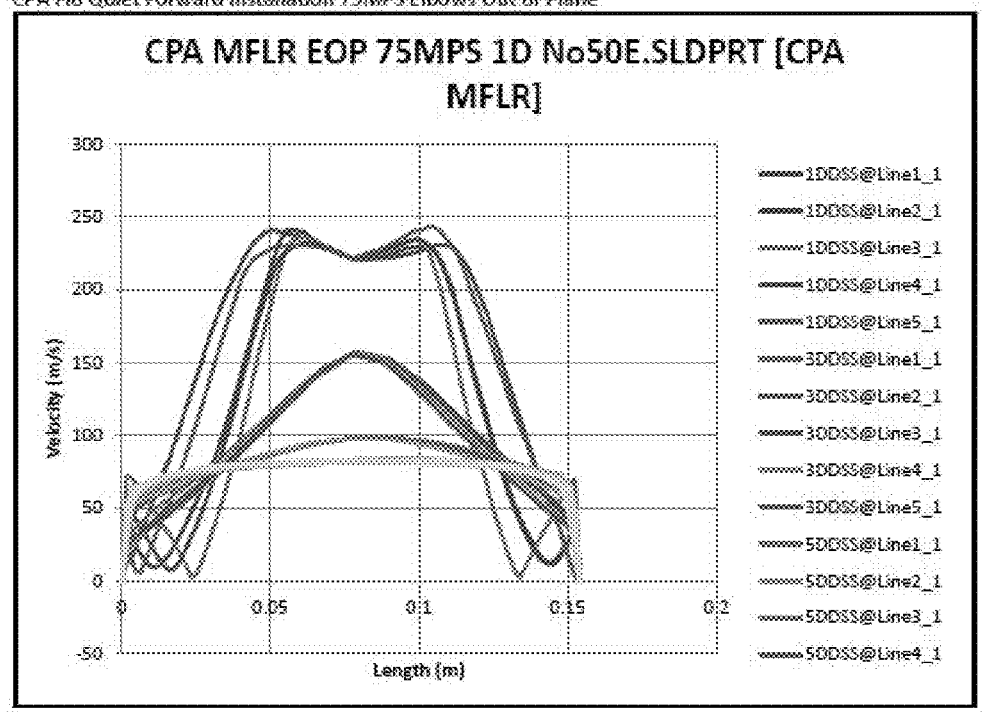
FIG. 12 is a diagram showing fluid profile for a reflector installed in a forward configuration after an out-of-plane elbow pipeline configuration.

FIG. 12 is a diagram showing fluid performance profile for a reflector installed in a forward configuration after an out-of-plane elbow pipeline configuration for a fluid having an initial fluid velocity of 75 m/s. The orifice plate is installed about 1 D downstream of the last elbow, and the fluid flow profile stabilizes at about 8 D. However, the profile is slightly asymmetric, and remains this way to about 20 D+.

Figure 13:
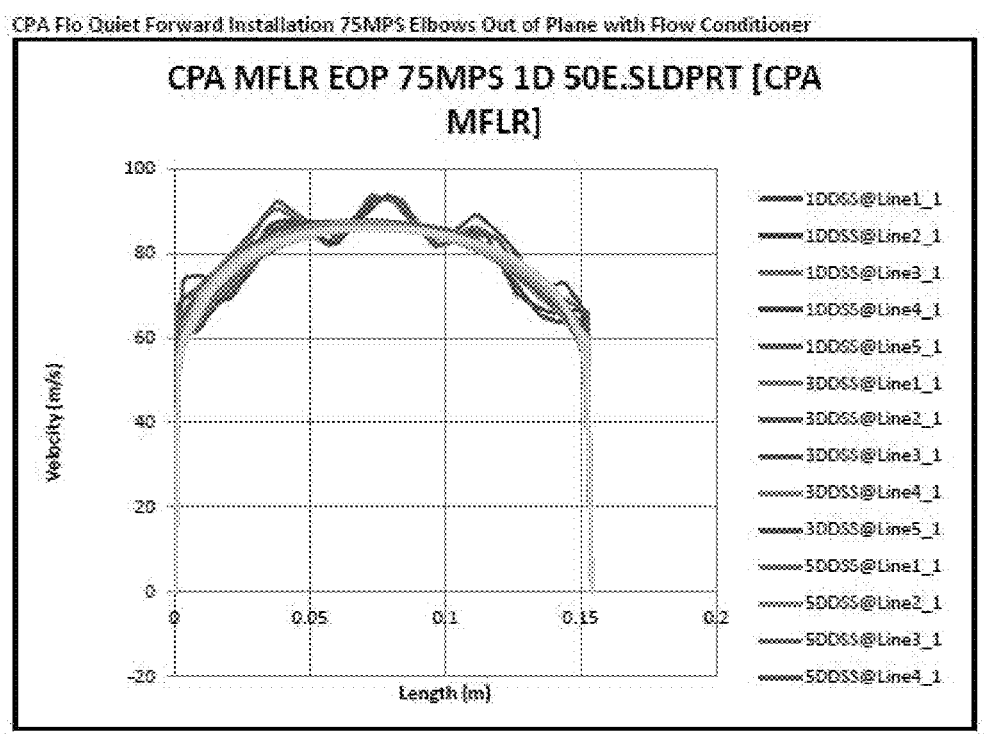
FIG. 13 is a diagram showing fluid profile for a reflector installed in FIG. 12 with a flow conditioner placed after the reflector.

FIG. 13 is a diagram showing fluid performance profile when a fluid flow conditioner (CPA 50E) is placed about 5 D after the reflector of FIG. 12. The fluid flow returns to near fully developed form almost immediately. There is a slight asymmetry in the profile that persists for about 20 D+, due to the elbows, but the velocities are fully developed, according to about ±5% of ideal flow.

Figure 14:
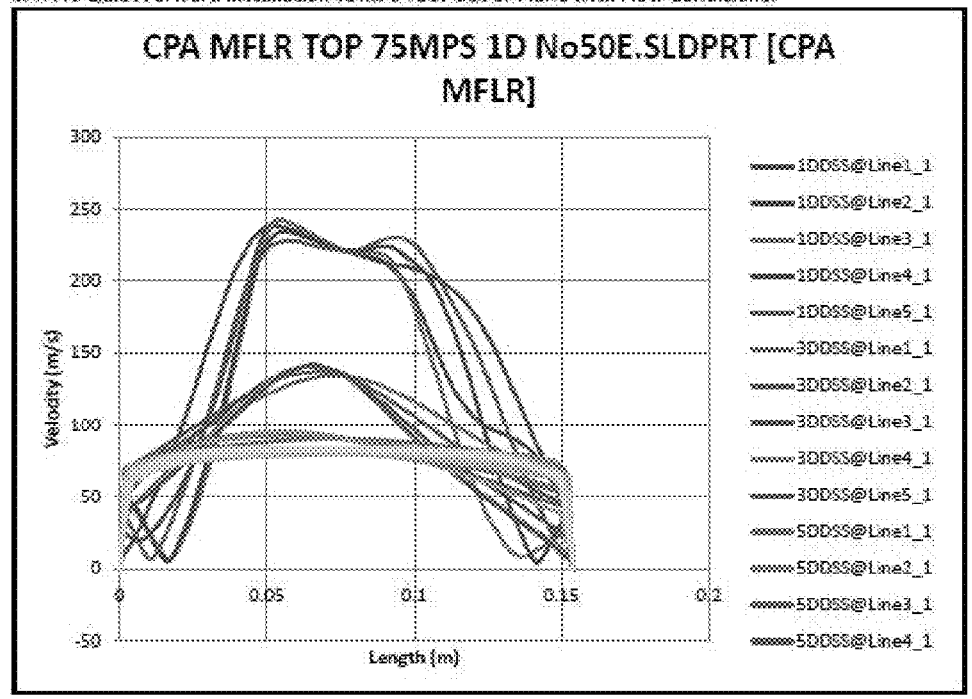
FIG. 14 is a diagram showing fluid profile for a reflector installed in a forward configuration after an out-of-plane T pipeline configuration.
Figure 15:
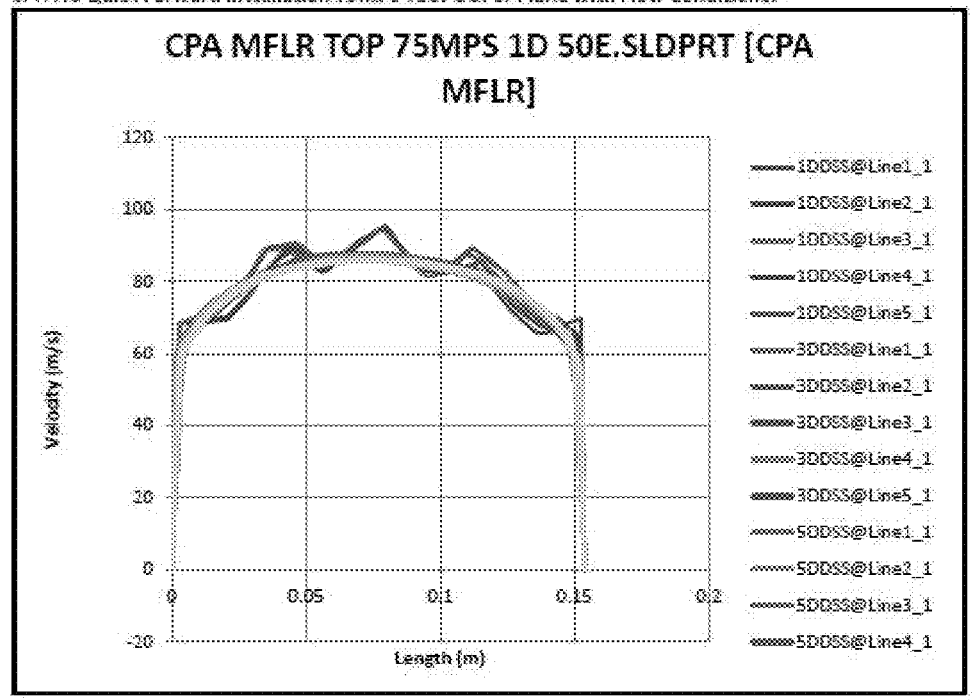
FIG. 15 is a diagram showing fluid profile for a reflector installed in FIG. 14 with a flow conditioner placed after the reflector.

FIG. 14 is a diagram showing fluid performance profile for a reflector installed in a forward manner in an out-of-plane T configuration, where the reflector is located in approximately the same location as in FIG. 12. Without a flow conditioner, the profile is flat, slightly asymmetric, and remains that way for about 20 D+ of pipe length. With a flow conditioner installed as in FIG. 13, the flow profile returns to fully developed form almost immediately, as shown in FIG. 15.

Figure 16A:
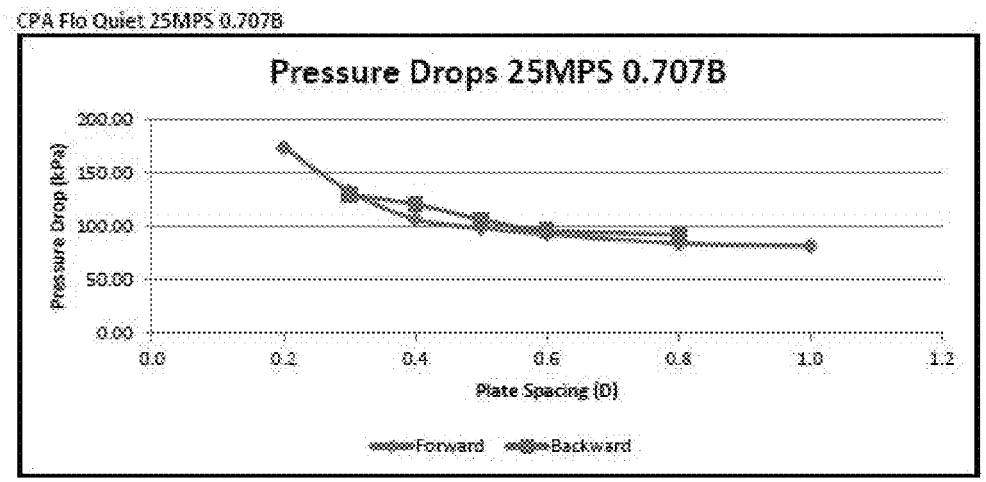
FIGS. 16a-c are diagrams showing pressure drop as a function of spacing between the disk and the orifice plate of a reflector according to an embodiment of the present invention.
Figure 16B:
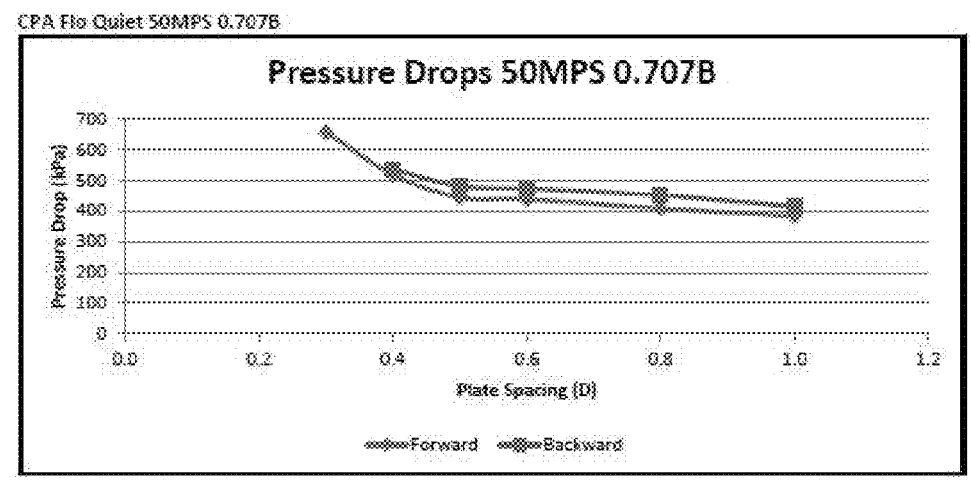
Figures 16C, 17A:
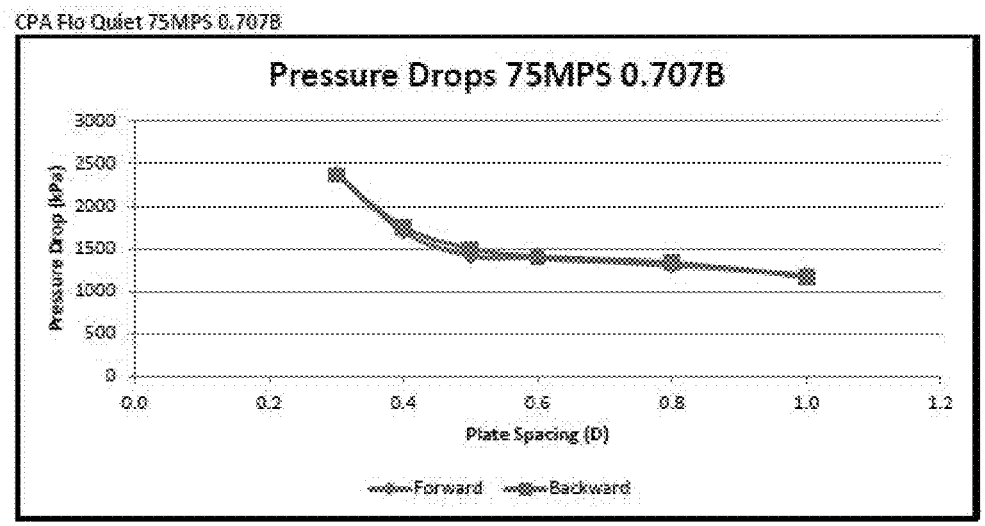
FIGS. 17a-b are tables of pressure drops and K-factors for a reflector installed in both a forward and a backward configuration, respectively.

With reference to FIG. 16a-c, diagrams are provided showing pressure drop as a function of spacing between the disk at the orifice plate (i.e., offset) and the beta ratio (i.e., size of orifice opening/inside diameter of pipe) for both forward and backward reflector installations at initial fluid velocities of 25 m/s, 50 m/s, and 75 m/s, respectively. A larger spacing offset results in better pressure performance. However, this also increases manufacturing costs. As a result, the optimal spacing was determined to be from about 0.5 D to about 0.707 D, as this is where pressure gains diminish substantially.

Figures 17B, 18:
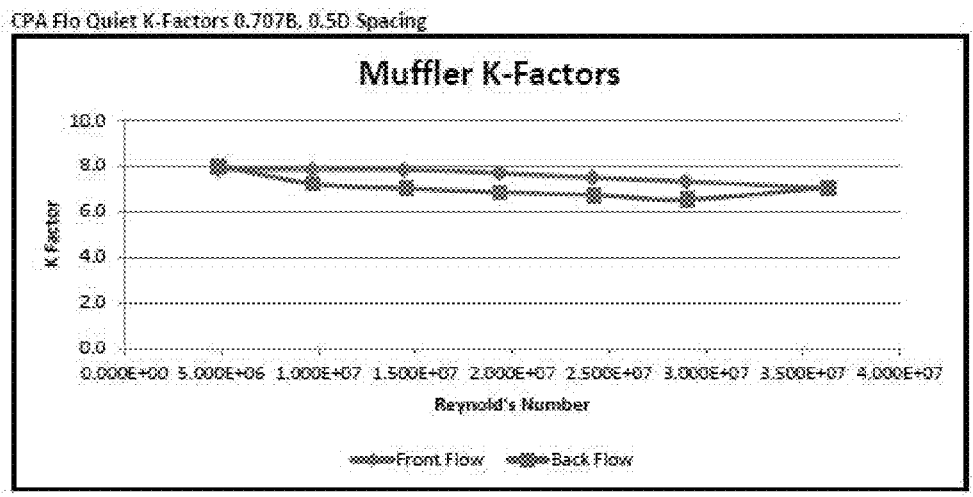
FIG. 18 is a chart showing K-factors for a reflector according to an embodiment of the present invention.

FIGS. 17a-b are tables showing inlet fluid velocity, pressure drops, and K-factors for a reflector installed in both a forward and a backward configuration, respectively. As can be seen from the tables, the K-Factor of a reflector may be approximately 8 at Reynold's Number 5 Million (10 m/s), decreasing to 7 at Reynold's Number 30 Million (75 m/s). FIG. 18 is a diagram showing K-factors as a function of Reynold's number.

Figure 19A:
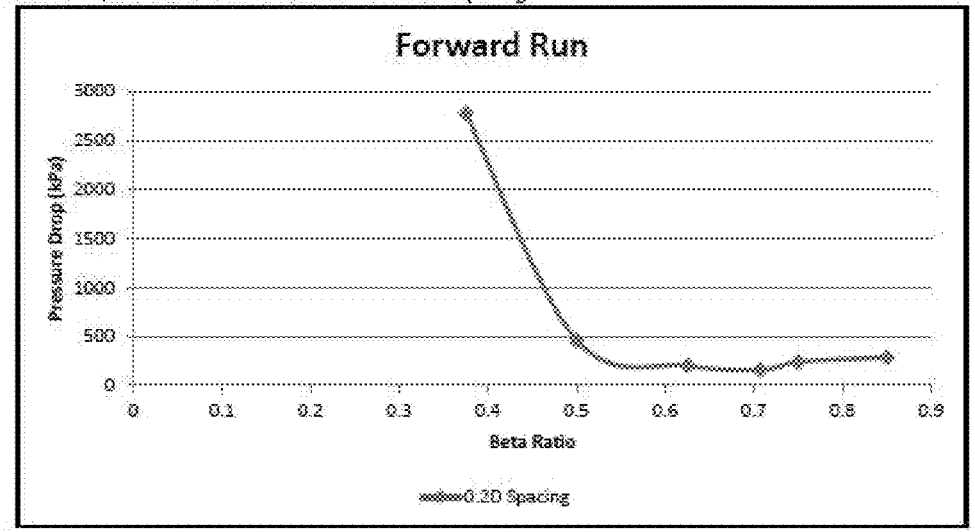
FIGS. 19a-c are diagrams showing pressure drop as a function of beta ratio for a reflector according to an embodiment of the present invention.
Figure 19B:
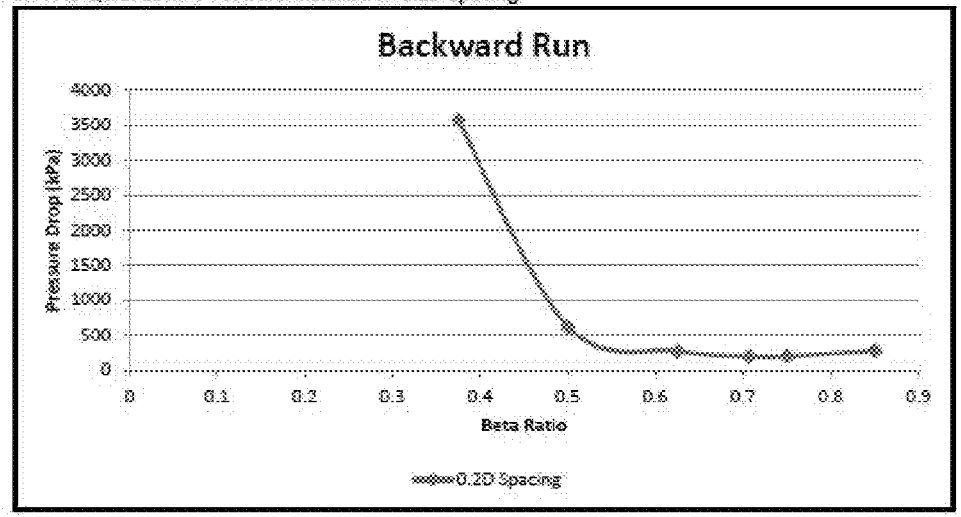
Figure 19C:
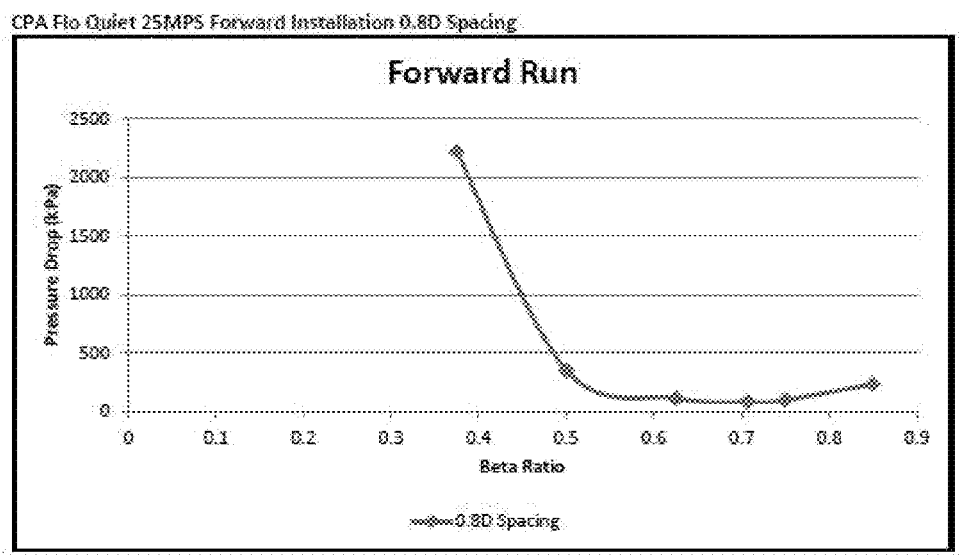

FIGS. 19a-c are diagrams showing pressure drop as a function of beta ratio. Testing indicated a preferred beta ratio of about 0.707 D, which is also the beta ratio that provides an equal flow area inlet and outlet. The beta ratio testing was performed at a fluid flow of 25 m/s for beta ratios of 0.2 D (backward and forward configurations) and 0.8 D (forward configuration).

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

What is claimed is:

1. A reflector for a fluid flow system, comprises:
    an orifice plate comprising a flange and an opening;
    at least one disk; and
    a plurality of vanes connected to each other along a longitudinal axis extending from the orifice plate to the at least one disk,
    wherein the orifice plate, the at least one disk and the plurality of vanes are keyed so that they physically interlock together.

2. A reflector according to claim 1, wherein a diameter of the at least one disk is the same as the opening in the orifice plate.

3. A reflector according to claim 1, comprising two or more disks.

4. A reflector according to claim 1, wherein the at least one disk comprises a plurality of apertures or holes.

5. A reflector according to claim 1, wherein the at least one disk has angled edges.

6. A reflector according to claim 1, wherein the at least one disk has rounded edges.

7. A reflector according to claim 1, wherein the at least one disk, the orifice plate, and the at least one vane comprise metal.

8. A pipe assembly, comprising:
    a fluid flow pipe;
    at least one reflector according to claim 1 disposed entirely within said fluid flow pipe in an orientation in which the at least one disk and the orifice plate are substantially perpendicular to a longitudinal axis of said fluid flow pipe.

9. A pipe assembly according to claim 8, wherein the reflector is disposed so that the at least one disk is upstream of the orifice plate.

10. A pipe assembly according to claim 8, wherein the reflector is disposed so that the at least one disk is downstream of the orifice plate.

11. A pipe assembly according to claim 8, wherein the opening of the orifice plate has a diameter of about 0.5 D to 0.707 D, wherein D is an inside pipe diameter of the fluid flow pipe.

12. A pipe assembly according to claim 11, wherein the opening of the orifice plate has a diameter of about 0.707 D.

13. A pipe assembly according to claim 8, wherein the at least one disk is spaced apart from the orifice plate by a length equivalent to about 0.5 D to 1 D, wherein D is an inside pipe diameter of the fluid flow pipe.

14. A pipe assembly according to claim 13, wherein the at least one disk is spaced apart from the orifice plate by a length equivalent to about 0.5 D.

15. A pipe assembly according to claim 8, wherein the reflector is disposed downstream of an elbow pipe configuration.

16. A pipe assembly according to claim 8, wherein the reflector is disposed downstream of a T pipe configuration.

17. A pipe assembly according to claim 8, further comprising a flow conditioner disposed upstream of the reflector.

18. A pipe assembly according to claim 8, further comprising a flow conditioner disposed downstream of the reflector.

19. A pipe assembly, comprising:
    a fluid flow pipe;
    at least one reflector according to claim 1 integral with a wall of said fluid flow pipe in an orientation in which the at least one disk and the orifice plate are substantially perpendicular to a longitudinal axis of said fluid flow pipe.

20. A fluid flow system, comprising:
    a fluid flow pipe;
    at least one reflector according to claim 1 disposed within said fluid flow pipe in an orientation in which the at least one disk and the orifice plate are substantially perpendicular to a longitudinal axis of said fluid flow pipe; and
    a device downstream of the reflector.

21. A fluid flow system according to claim 20, wherein the device comprises a flow meter.

22. A fluid flow system according to claim 20, further comprising a flow conditioner disposed downstream of the reflector.

23. A reflector according to claim 1, further comprising a nose cone on said at least one disk.

24. A reflector according to claim 23, further comprising a diffuser attached to the flange of the orifice plate.

25. A reflector according to claim 1, wherein the at least one disk has no holes.

26. A reflector according to claim 1, wherein the plurality of vanes are connected to each other along a lateral edge.

27. A reflector for a fluid flow system, comprises:
   an orifice plate comprising a flange and an opening;
   at least one disk;
   a plurality of vanes connected to each other along a longitudinal axis extending from the orifice plate to the at least one disk; and
   a nose cone on said at least one disk, wherein a base of the nose cone covers said at least one disk.

28. A reflector for a fluid flow system, comprises:
   an orifice plate comprising a flange and an opening;
   at least one disk comprising a plurality of apertures or holes; and
   a plurality of vanes connected to each other along a longitudinal axis extending from the orifice plate to the at least one disk.

* * * * *